United States Patent
Manabe et al.

(10) Patent No.: US 10,636,586 B2
(45) Date of Patent: Apr. 28, 2020

(54) GRAPHENE DISPERSION, PROCESS FOR PRODUCING SAME, PROCESS FOR PRODUCING PARTICLES OF GRAPHENE/ACTIVE MATERIAL COMPOSITE, AND PROCESS FOR PRODUCING ELECTRODE PASTE

(71) Applicant: TORAY INDUSTRIES, INC., Tokyo (JP)

(72) Inventors: Koichiro Manabe, Otsu (JP); Eiichiro Tamaki, Otsu (JP); Manabu Kawasaki, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 239 days.

(21) Appl. No.: 15/760,506

(22) PCT Filed: Sep. 9, 2016

(86) PCT No.: PCT/JP2016/076654
§ 371 (c)(1),
(2) Date: Mar. 15, 2018

(87) PCT Pub. No.: WO2017/047521
PCT Pub. Date: Mar. 23, 2017

(65) Prior Publication Data
US 2018/0261402 A1 Sep. 13, 2018

(30) Foreign Application Priority Data
Sep. 18, 2015 (JP) .................................. 2015-184813

(51) Int. Cl.
| | | |
|---|---|---|
| *C01B 32/194* | (2017.01) | |
| *H01G 11/38* | (2013.01) | |
| *H01G 11/36* | (2013.01) | |
| *H01M 4/62* | (2006.01) | |
| *H01G 11/24* | (2013.01) | |
| *B01J 13/00* | (2006.01) | |
| *H01M 4/583* | (2010.01) | |

(52) U.S. Cl.
CPC .......... *H01G 11/38* (2013.01); *B01J 13/0026* (2013.01); *C01B 32/194* (2017.08); *H01G 11/24* (2013.01); *H01G 11/36* (2013.01); *H01M 4/583* (2013.01); *H01M 4/625* (2013.01); *C01B 2204/22* (2013.01); *C01B 2204/32* (2013.01); *C01P 2002/85* (2013.01); *C01P 2006/12* (2013.01); *C01P 2006/22* (2013.01)

(58) Field of Classification Search
CPC ..... H01G 11/38; H01G 11/36; B01J 13/0026; C01B 32/194; C01B 2204/22; C01P 2006/12; C01P 2002/85; C01P 2006/22; H01M 4/62; H01M 4/139; H01M 4/583; H01M 4/04; H01M 4/36
See application file for complete search history.

(56) References Cited

U.S. PATENT DOCUMENTS

2015/0140438 A1 5/2015 Sun et al.
2016/0380270 A1 12/2016 Lee et al.

FOREIGN PATENT DOCUMENTS

| JP | 2014009151 A | 1/2014 |
|---|---|---|
| JP | 2015059079 A | 3/2015 |
| JP | 2015520109 A | 7/2015 |
| KR | 20100121978 A | 11/2010 |
| KR | 20150077321 A | 7/2015 |
| WO | 2007047084 A2 | 4/2007 |
| WO | 2013181994 A1 | 12/2013 |
| WO | 2014140324 A1 | 9/2014 |
| WO | 2015122498 A1 | 8/2015 |

OTHER PUBLICATIONS

International Search Report and Written Opinion for International Application No. PCT/JP2016/076654, dated Oct. 18, 2016, 5 pages.

*Primary Examiner* — Richard M Rump
(74) *Attorney, Agent, or Firm* — Ratnerprestia

(57) ABSTRACT

A graphene material in a specific form is provided that has a high dispersibility and can maintain a high electric conductivity and ion conductivity when used as material for electrode manufacturing. A graphene dispersion liquid is provided including graphene dispersed in a solvent having a N-methyl pyrolidone content of 50 mass % or more and, when diluted with N-methylpyrolidone to a graphene weight fraction of 0.000013, giving a diluted solution having a weight-based absorptivity coefficient, which is calculated by Equation (1) given below, of 25,000 cm-1 or more and 200,000 cm-1 or less at a wavelength of 270 nm:

weight-based absorptivity coefficient (cm$^{-1}$)=absorbance/{0.000013×cell's optical path length (cm)}. (1)

14 Claims, No Drawings

GRAPHENE DISPERSION, PROCESS FOR PRODUCING SAME, PROCESS FOR PRODUCING PARTICLES OF GRAPHENE/ACTIVE MATERIAL COMPOSITE, AND PROCESS FOR PRODUCING ELECTRODE PASTE

CROSS REFERENCE TO RELATED APPLICATIONS

This is the U.S. National Phase application of PCT/JP2016/076654, filed Sep. 9, 2016, which claims priority to Japanese Patent Application No. 2015-184813, filed Sep. 18, 2015, the disclosures of these applications being incorporated herein by reference in their entireties for all purposes.

TECHNICAL FIELD OF THE INVENTION

The present invention relates to a graphene dispersion liquid and a production method therefor, as well as methods for producing graphene/active material composite particles and electrode paste therefrom.

BACKGROUND OF THE INVENTION

Graphene is in the form of a two-dimensional crystal of carbon atoms and great attention has been focused on graphene as industrial material since its discovery in 2004. Graphene has excellent electric, thermal, optical, and mechanical characteristics, and there are growing expectations for its applications in wide areas such as production of battery materials, energy storage materials, electronic devices, and composite materials.

Methods available for the production of graphene include the mechanical exfoliation method, CVD (chemical vapor deposition) method, and CEG (crystal epitaxial growth) method. Among others, the oxidization-and-reduction method, in which graphite oxide, also called oxidized black lead, is produced first through oxidization of natural graphite, followed by converting it into graphene through reduction reaction, is now expected as a promising industrial method for large-scale production.

In Patent document 1, graphite oxide is expanded and exfoliated while it is heated for reduction in order to produce thin flakes of graphite with a large specific surface area.

In Patent document 2, graphene is chemically reduced in the presence of catechol and subsequently freeze-dried to prepare a graphene powder with high dispersibility.

In Patent document 3, graphene oxide is chemically reduced in the presence of a water-soluble compound having a 9,9-bis-(substituted aryl)-fluorene backbone and the resulting aqueous graphene dispersion is mixed with an organic solvent. Then, graphene is recovered by centrifugal sedimentation and an organic solvent is added to prepare a graphene dispersion.

Non-patent document 1 reports that when the hydrazine reduction reaction of a thin graphite oxide film is prolonged, a high-degree reduction of acidic groups can be achieved to ensure an increase in the absorbance at 270 nm.

PATENT DOCUMENTS

[Patent Document 1]: International Publication WO 2007/047084
[Patent Document 2]: International Publication WO 2013/181994
[Patent document 3]: Japanese Unexamined Patent Publication (Kokai) No. 2015-059079

NON-PATENT DOCUMENTS

[Non-patent document 1]: Yoshiaki Matsuo, Tanso (Carbon), No. 245, 200-205 (2010)

SUMMARY OF THE INVENTION

To work effectively as conductive agent, the graphene material to be used should be in the form of thin, highly dispersible flakes. However, the graphene material prepared by the heating-expansion-reduction process as proposed in Patent document 1 tends to be so large in specific surface area as to induce agglomeration and a decrease in dispersibility.

Even if a dispersing agent is used as described in Patent document 2, subsequent freeze-drying tends to cause stacking (layered agglomeration) of graphene molecules, leading to insufficient exfoliation of the graphene powder.

When using the technique proposed in Patent document 3, the water-soluble compound having a 9,9-bis-(substituted aryl)-fluorene backbone is removed in the dispersion liquid preparation step, and accordingly the effect of inhibiting graphene agglomeration is reduced, failing to prevent the agglomeration of graphene in the dispersion liquid.

When the number of acidic groups is decreased to recover the conjugated system on the graphite oxide as described in Non-patent document 1, the decrease of acidic groups works to reduce the affinity for the solvent and accordingly cause a decrease in dispersibility in the solvent, failing to prevent the agglomeration.

Thus, graphene has a strong tendency to agglomerate and therefore fails to develop an adequate dispersibility when produced by the oxidization/reduction method, making it impossible to achieve its full potential. An object of the present invention is to provide a graphene material in a specific form that has a high dispersibility and can maintain a high electric conductivity and ion conductivity when used as material for electrode manufacturing.

To solve the above problems, one aspect of the present invention provides a graphene dispersion liquid including graphene dispersed in a solvent having a N-methylpyrolidone content of 50 mass % or more and, when diluted with N-methylpyrolidone to a graphene weight fraction of 0.000013, giving a diluted solution having a weight-based absorptivity coefficient as calculated by Equation (1) given below in the range of 25,000 $cm^{-1}$ or more and 200,000 $cm^{-1}$ or less at a wavelength of 270 nm:

$$\text{weight-based absorptivity coefficient }(cm^{-1}) = \text{absorbance}/\{0.000013 \times \text{cell's optical path length (cm)}\}. \quad (1)$$

The production method for the graphene dispersion liquid according to an aspect of the present invention includes:
a reduction step for reducing graphene oxide dispersed in a water-containing dispersion medium;
a NMP mixing step for mixing the intermediate dispersion liquid resulting from the reduction step with a solvent having a N-methylpyrolidone content of 50 mass % or more (NMP-containing solvent);
a strong stirring step for stirring the intermediate dispersion liquid resulting from the NMP mixing step at a shear rate of 5,000 per second to 50,000 per second; and a water removal step for removing at least part of the water from the intermediate dispersion liquid by a combination of the addition of a NMP-containing solvent and suction filtration or by distillation.

In the graphene dispersion liquid according to the present invention, flakes of graphene that are thin enough to work as conductive additive are highly dispersed in a solvent having a N-methylpyrolidone content of 50 mass % or more where their agglomeration is depressed. The use of such a graphene dispersion liquid ensures a high dispersibility of graphene in a resin or electrode paste and enables easy adsorption of graphene to the surface of inorganic particles such as of an active material. Accordingly, graphene will be adsorbed to the surface of an active material existing in a lithium ion battery etc. to maintain a high electronic conductivity and ion conductivity for a long period of time on the surface of the active material in electrodes.

DETAILED DESCRIPTION OF EMBODIMENTS OF THE INVENTION

<Graphene Dispersion Liquid>

The graphene dispersion liquid according to embodiments of the present invention is a dispersion liquid in which graphene is dispersed in a solvent having a N-methylpyrolidone (NMP) content of 50 mass % or more. Graphene has a structure containing a stack of graphene monolayers and the structure is in the form of a thin sheet.

For the graphene dispersion liquid according to an embodiment of the present invention, a solution diluted with NMP in which graphene accounts for a weight fraction adjusted to 0.000013 relative to the entire diluted solution that has a weight fraction of 1 has a weight-based absorptivity coefficient as calculated by Equation (1) given below (hereinafter referred to simply as weight-based absorptivity coefficient) in the range of 25,000 cm$^{-1}$ or more and 200,000 cm$^{-1}$ or less at a wavelength of 270 nm.

$$\text{Weight-based absorptivity coefficient (cm}^{-1}\text{)}=\text{absorbance}/\{(0.000013 \times \text{cell's optical path length (cm)}\} \quad (1)$$

The absorbance per unit weight of graphene varies depending on the degree of exfoliation of the graphene, and it is highest for monolayer graphene and decreases with an increasing number of layers and an increasing degree of agglomeration.

If the weight-based absorptivity coefficient is less than 25,000 cm$^{-1}$, the graphene contained will be low in the degree of exfoliation or in the dispersibility in NMP, making it impossible to form and maintain good conductive paths in resin or electrode paste. If the weight-based absorptivity coefficient is larger than 200,000 cm$^{-1}$, on the other hand, the graphene will have an increased viscosity due to an increased surface area, resulting in deterioration in handleability of the graphene dispersion liquid. The weight-based absorptivity coefficient is preferably 40,000 cm$^{-1}$ or more and 150,000 cm$^{-1}$ or less, and more preferably 45,000 cm$^{-1}$ or more and 100,000 cm$^{-1}$ or less.

For a diluted solution prepared as described above, furthermore, the ratio between the absorbance at a wavelength of 270 nm and that at 600 nm as calculated by Equation (2) given below (hereinafter simply referred to as absorbance ratio) is preferably 1.70 or more and 4.00 or less, more preferably 1.80 or more and 3.00 or less, and still more preferably 1.90 or more and 2.50 or less:

$$\text{absorbance ratio} = \text{absorbance (270 nm)}/\text{absorbance (600 nm)}. \quad (2)$$

The absorbance of light contains an absorption component and a scattering component, and the scattering component varies with the surface state of the graphene. The contribution of the scattering component to the absorbance is small at a wavelength of 270 nm, but the absorption component is smaller at a wavelength of 600 nm, leading to an increased contribution of the scattering component to the absorbance. If the graphene contained has a high degree of agglomeration, the absorbance ratio will be less than 1.70, possibly making it difficult to form and maintain good conductive paths in resin or electrode paste. As the graphene is fragmented excessively, the absorbance ratio will become larger than 4.00, possibly leading to increased tendency to agglomerate in resin or electrode paste. Here, the absorbance of a diluted solution prepared from a graphene dispersion liquid can be measured using an ultraviolet and visible spectrophotometer. The absorbance values of graphene to be used in Equations (1) and (2) given above can be obtained by subtracting the absorbance of the solvent used in the diluted solution from the absorbance of the diluted solution prepared from the graphene dispersion liquid.

It is preferable for the graphene dispersion liquid according to the present invention to have a solid content G of 0.3 mass % or more and 40 mass % or less. The solid content is more preferably 20 mass % or less, still more preferably 10 mass % or less, still more preferably 7 mass % or less, and particularly preferably 5 mass % or less. On the other hand, the solid content is more preferably 0.7 mass % or more, and still more preferably 1 mass % or more. If the solid content is 5 mass % or less, the flowability tends to increase, leading to a high handleability. As the solid content becomes more than 40 mass %, the graphene tends to suffer layered agglomeration in the dispersion liquid, making it difficult to maintain a good dispersed state, whereas when used for electrode paste production, a solid content of less than 0.3 mass % will lead to an electrode paste with a decreased solid content due to the solvent in the dispersion liquid, possibly resulting in a decrease in viscosity and deterioration in coating properties.

The solid content G of a graphene dispersion liquid can be determined after removing the solvent from the graphene dispersion liquid by measuring the weight of the dried material and dividing the measured value by the weight of the graphene dispersion liquid itself. Specifically, approximately 1 gram of a graphene dispersion liquid is adhered to a glass substrate with a known weight and heated for 1.5 hours on a hot plate adjusted to a temperature of 120° C. to volatilize the solvent, followed by calculation using the measured weight of the remaining graphene material.

It is preferable for the graphene dispersion liquid according to the present invention to contain a surface treatment agent having an acidic group (hereinafter occasionally referred to simply as surface treatment agent). The surface treatment agent having an acidic group should be at least partly adhered to the surface of the graphene to have the effect of enhancing the dispersibility of the graphene. Here, the acidic group is a hydroxyl group, phenolic hydroxyl group, nitro group, carboxyl group, or carbonyl group. There are no specific limitations on the surface treatment agent as long as it is a compound having a hydroxyl group, phenolic hydroxyl group, nitro group, carboxyl group, or carbonyl group, and it may be either a polymer compound or a low molecular weight compound.

Examples of the polymer compound having an acidic group include polyvinyl pyrolidone, polyvinyl alcohol, and polymethyl vinyl ether. From the viewpoint of affinity with a graphene surface, it is preferable for the low molecular weight compound to be a compound having an aromatic ring. From the viewpoint of increasing the electric conductivity of graphene, the use of a low molecule compound is preferable to a polymer compound.

In particular, compounds having catechol groups are preferred as surface treatment agents because they are generally adhesive to graphene and dispersible in solvents. Such compounds having catechol group include catechol, dopamine hydrochloride, 3-(3,4-dihydroxyphenyl)-L-alanine, 4-(1-hydroxy-2-aminoethyl) catechol, 3,4-dihydroxy benzoic acid, 3,4-dihydroxyphenyl acetic acid, caffeic acid, 4-methyl catechol, and 4-tert-butyl pyrocatechol.

The acidic group existing in a surface treatment agent is preferably a phenolic hydroxyl group. Examples of a compound having a phenolic hydroxy group include phenol, nitro phenol, cresol, catechol, and compounds having a structure that can be formed by at least partial substitution thereof.

A surfactant having an acidic group may also be used preferably as surface treatment agent. Examples of the surfactant include cationic surfactants, anionic surfactants, and nonionic surfactants, but since anions and cations may participate themselves in electrochemical reactions, nonionic surfactants are preferred for use in battery materials because they are not ionized.

The surface treatment agent may contain a basic group in addition to an acidic group, and in particular, its dispersibility may be enhanced if having an amino group. Accordingly, a compound having both a catechol group and an amino group may be particularly preferred as surface treatment agent. Examples of such a compound include dopamine hydrochloride.

For the graphene dispersion liquid according to the present invention, the median diameter D (μm) of the graphene measured by the laser diffraction/scattering type particle size distribution measurement method and the average size S (μm) in the planar direction of the graphene calculated from the arithmetic mean of the longest diameter and shortest diameter of the graphene observed by a laser microscope preferably meet both Equations (3) and (4) given below:

$$0.5 \ \mu m \leq S \leq 15 \ \mu m \tag{3}$$

$$1.0 \ 5 \leq D/S \leq 3.0 \tag{4}$$

For a graphene dispersion liquid, the median diameter D (μm) of graphene is a particle diameter corresponding to the median of its particle size distribution determined by subjecting the liquid directly to laser diffraction/scattering type particle size distribution measurement. Specifically, it can be determined by the method described in Measurement example 5 described later. There are no specific limitations on the size S (μm) in the planar direction of graphene (average of the longest diameter and the shortest diameter), but its lower limit is preferably 0.5 μm or more, more preferably 0.7 μm or more, and still more preferably 1.0 μm or more while its upper limit is preferably 15 μm or less, more preferably 10 μm or less, and still more preferably 4 μm or less. If graphene layers in an electrode have an S less than 0.5 μm, the number of contacts between them will be so large that the electric resistance will tend to increase. If S is more than 15 μm, on the other hand, the graphene will be low in the degree of exfoliation and dispersibility in the solvent and it is feared that when used as paste for electrodes, it may suffer from poor coating properties and low coat film quality, possibly leading to electrodes in which good conductive paths are not formed.

Furthermore, if D/S is less than 1.0, that is, in the case where the size S in the planar direction of graphene is larger than the median diameter D, it means that the graphene layers have folded structures in the solvent rather than planar shapes. In this case, each graphene layer will be isolated, possibly failing to form good conductive paths in the resulting electrodes. If the D/S ratio is more than 3.0, on the other hand, it means that the graphene layers are excessively agglomerated, making it difficult to achieve required degrees of exfoliation and dispersibility. The D/S ratio is preferably 1.4 or more and 2.5 or less.

For the graphene dispersion liquid according to the present invention, furthermore, the average thickness T (nm) of graphene observed by a laser microscope preferably meets Equation (5) given below.

$$0.1 \leq S/T \leq 1.5 \tag{5}$$

The average thickness T (nm) of graphene should be determined as described below. First, the graphene dispersion liquid is diluted with NMP to 0.002 mass %, dropped on a glass substrate, and dried. Then, the graphene on the substrate is observed by a laser microscope, which serves for observation of three dimensional shapes, and the thickness of each graphene layer is measured. For a flake having a thickness distribution, the average over the surface area is determined. A total of 50 graphene flakes are selected randomly, and their thicknesses are calculated and averaged to give the average thickness T.

If the S/T ratio is less than 0.1, it means that the thickness in the layer stacking direction of the graphene flakes is large relative to the size in the planar direction of the graphene flakes. In this case, the electrodes produced will have poor electric conductivity. If the S/T ratio is larger than 1.5, on the other hand, it means that the thickness in the layer stacking direction of the graphene flakes is small relative to the size in the planar direction of the graphene flakes. In this case, the viscosity of the dispersion liquid itself and that of electrode pastes produced therefrom are likely to increase, possibly leading to a decrease in workability during handling. For the graphene dispersion liquid according to the present invention, it is preferable for the following equation to hold: $0.2 \leq S/T \leq 0.8$.

The thickness T and the size in the planar direction S of graphene can be measured using a laser microscope, atomic force microscope, etc., on a specimen prepared by spreading and drying the diluted solution on a substrate. Specifically, they can be determined by the methods described in Measurement examples 6 and 7 described later.

For the graphene dispersion liquid according to the present invention, it is preferable for the value of (W2−W1)/G to be 0.005 or more and 0.05 or less, where W1 (mass %) is the water content measured at 130° C. by the Karl Fischer's method; W2 (mass %) is the water content measured at 250° C. by the Karl Fischer's method; and G (mass %) is the solid content of the graphene.

Here, W1 shows the percentage of the sum of roughly calculated amounts of the free water contained in the organic solvent in the graphene dispersion liquid and the adsorbed water that is adsorbed on the graphene but can be removed easily. On the other hand, W2 denotes the percentage of the combined amount of the aforementioned sum of free water and adsorbed water and the bound water that is strongly bonded to the graphene surface and cannot be removed at a temperature as high as 130° C. Thus, (W2−W1) gives a roughly calculated content of the bound water that is strongly bonded to the graphene.

Such bound water is bonded strongly via the hydroxyl group, carboxyl group, epoxy group, carbonyl group, etc., contained in the graphene. The existence of this bound water allows the graphene and the organic solvent to interact easily with each other, thereby enabling stable dispersion. It is desired therefore that the weight ratio of the bound water to the graphene be controlled in an appropriate range.

The existence of bound water also serves to improve the ion conductivity of the graphene. Graphene has a thin, plate-like structure and in addition, π-π interaction occurs between graphene layers, serving to promote the stacking of the layers. It is difficult for ions to move in graphene if these graphene layers are stacked without interlaminar gaps. Compared to this, if graphene contains a moderate amount of bound water, interlaminar gaps are formed easily between stacked graphene layers, often leading to an increased number of ion conducting paths and an improved ion conductivity.

If the value of (W2−W1)/G is less than 0.005, interaction with the organic solvent will be reduced and agglomeration will be promoted. After entering an electrode in a lithium ion battery, agglomerated graphene cannot easily form conductive paths and in addition, the ion conductivity will be low, often leading to deterioration in charge and discharge performance. If the value of (W2−W1)/G is more than 0.05, graphene in a lithium ion battery may suffer electrolysis of part of the bound water to cause gas generation, which can have adverse influence on the battery performance. If the value of (W2−W1)/G is controlled in the range of 0.005 or more and 0.05 or less, it serves to achieve good dispersion in the organic solvent to ensure both the formation of good conductive paths and high ion conductivity in the electrodes in a lithium ion battery. It is preferable for the value of (W2−W1)/G to be 0.008 or more, more preferably 0.01 or more. It is also preferable for the value of (W2−W1)/G to be 0.03 or less, more preferably 0.02 or less.

W1 and W2 are measured by the Karl Fischer's method. More specifically, they are measured by the water evaporation-coulometric titration procedure specified in JIS K 0113 (2005) 8.3. There are no specific limitations on the measuring apparatus to be used, and any appropriate commercial water content measuring apparatus may be adopted. Examples of such a water content measuring apparatus include AQ-2200 Karl Fischer Aquameter manufactured by Hiranuma Sangyo Co., Ltd.

For the graphene contained in the graphene dispersion liquid according to the present invention, the specific surface area as measured by the BET measuring method (hereinafter occasionally referred to simply as specific surface area) is preferably 80 $m^2/g$ or more and 250 $m^2/g$ or less. The specific surface area of graphene reflects the thickness of the graphene and the degree of exfoliation of the graphene. Specifically, the graphene becomes thinner and the degree of exfoliation becomes higher as it increases.

It tends to become difficult to form a conductive network if the specific surface area of the graphene is less than 80 $m^2/g$ whereas the dispersibility tends to decrease if it is more than 250 $m^2/g$. The specific surface area of the graphene is preferably 100 $m^2/g$ or more, more preferably 130 $m^2/g$ or more. Similarly, it is preferably 200 $m^2/g$ or less and more preferably 180 $m^2/g$ or less. For the BET measuring method, a graphene dispersion liquid is predried by a vacuum dryer, freeze-drier, or the like, and the resulting dried specimen is examined according to the procedure specified in JIS Z 8830 (2013). The quantity of adsorbed gas is measured by the carrier gas method and the adsorption data are analyzed by the one point method.

The quotient of the value of (W2−W1)/G of the graphene dispersion liquid according to the present invention divided by the specific surface area of the graphene measured by the BET measuring method is preferably 0.000025 $g/m^2$ or more and 0.00025 $g/m^2$ or less. The quotient of (W2−W1)/G divided by the specific surface area represents the weight of bound water per unit surface area of graphene. If the weight of bound water per unit surface area of graphene is too large, the graphene will become unable to hold the bound water, leading easily to electrolysis of water. If the weight of bound water per unit surface area of graphene is too small, the graphene dispersion liquid tends to deteriorate in dispersion stability. The quotient of (W2−W1)/G divided by the specific surface area is preferably 0.000035 $g/m^2$ or more and 0.00015 $g/m^2$ or less, more preferably 0.000050 $g/m^2$ or more and 0.00010 $g/m^2$ or less.

The solvent to be used for the graphene dispersion liquid according to the present invention should have a N-methylpyrrolidone content of 50 mass % or more. The lactam structure contained in N-methylpyrrolidone is high in affinity not only for nitrogen-containing functional groups such as amino group and nitro group but also for water. As described later, the graphene to be used preferably has nitrogen on the surface and in that case, the three components of graphene's bound water, nitrogen, and N-methylpyrrolidone can interact with each other to form a good dispersion state.

The preferred solvent components other than NMP to be contained in the graphene dispersion liquid include organic solvents having a dipole moment of 3.0 Debye or more. Examples of such solvents include γ-butyrolactone, dimethyl acetamide, dimethyl formamide, dimethyl sulfoxide, and acetonitrile. Furthermore, since highly volatile solvents are difficult to handle in a stable way, it is preferable to adopt a solvent with a high boiling point. It is preferable for the solvents other than NMP to have boiling points of 150° C. or more, preferably 180° C. or more.

For the graphene existing in the graphene dispersion liquid according to the present invention, the element ratio of oxygen to carbon (O/C ratio) determined by X-ray photoelectron spectroscopy is preferably 0.05 or more and 0.40 or less. The procedure of X-ray photoelectron spectroscopy includes predrying a graphene dispersion liquid by a vacuum dryer, freeze-drier, or the like, introducing the dried specimen into a measuring chamber having a high vacuum chamber, applying soft X ray to the surface of the specimen placed in an ultrahigh vacuum, and detecting the photoelectrons released from the surface using an analyzer. These photoelectrons are examined by the wide scan and narrow scan modes and the binding energy of the bound electrons in the substance is determined to provide element information on the substance surface.

Examination of the graphene dispersion liquid according to the present invention by X-ray photoelectron spectroscopy detects the C1s peak attributed to carbon appearing near 284 eV. It is known that when the carbon is bonded to oxygen, the peak shifts toward the high energy side. More specifically, the peaks attributed to C—C bond, C═C double bond, or C—H bond, in which the carbon atoms are not bonded to oxygen, do not shift and appear near 284 eV, whereas the peaks attributed to C—O single bond, C═O double bond, and COO bond shift to near 286.5 eV, near 287.5 eV, and near 288.5 eV, respectively. As a result, signals derived from carbon atoms are detected in a shape of overlapping peaks located near 284 eV, near 286.5 eV, near 287.5 eV, and near 288.5 eV. At the same time, the N1s peak attributed to nitrogen is detected near 402 eV and the O1s peak attributed to oxygen is detected near 533 eV. Then, the O/C ratio can be calculated from the peak areas of the C1s peak and the O1s peak.

The oxygen atoms existing on the graphene surface are those in the acidic groups bonded to the graphene itself and those in the acidic groups contained in the surface treatment agent adhered to the graphene surface. These acidic groups serve to improve the dispersion state of the graphene and work also as contact points where bound water is bonded to the graphene. The dispersibility deteriorates if the graphene surface lacks acidic groups whereas the electric conductivity decreases, leading to deterioration in performance as conductive additive, if there exist excessive numbers of acidic groups on the graphene surface. The O/C ratio of graphene is more preferably 0.07 or more, still more preferably 0.09 or more, and particularly preferably 0.10 or more. Similarly, it is more preferably 0.30 or less, still more preferably 0.20 or less, and particular preferably 0.15 or less.

The O/C ratio of graphene can be controlled by changing the oxidation degree of the graphene oxide fed as starting material and the quantity of the surface treatment agent added. The number of the remaining oxygen atoms after the reduction treatment increases with an increasing oxidation degree of the graphene oxide whereas the number of the remaining oxygen atoms after the reduction treatment decreases with a decreasing oxidation degree. The number of oxygen atoms can be increased by adding an increased amount of a surface treatment agent having an acidic group.

For the graphene existing in the dispersion liquid, the element ratio of nitrogen to carbon (N/C ratio) determined by X-ray photoelectron spectroscopy is preferably 0.005 or more and 0.030 or less, more preferably 0.010 or more and 0.025 or less. The nitrogen atoms existing on the graphene surface are attributed to the nitrogen-containing functional groups, such as amino group and nitro group, contained in the surface treatment agent and nitrogen-containing heterocyclic rings in the pyridine group, imidazole group, etc. It is preferable that such nitrogen-containing groups be contained in moderate amounts in order to improve the dispersibility of graphene. If the N/C ratio of graphene is more than 0.030, the conductivity tends to decrease as nitrogen atoms substitute the graphene conjugated structures. On the other hand, the existence of a small amount of a nitrogen-containing surface treatment agent is preferred because it can contribute to the dispersibility of graphene. Here, the N/C ratio, as in the case of the O/C ratio, can be determined from the peak areas of the C1s peak and the N1s peak.

<Production Method for the Graphene Dispersion Liquid>

The graphene dispersion liquid according to the present invention can be produced by:
a reduction step for reducing graphene oxide dispersed in a water-containing dispersion medium;
a NMP mixing step for mixing the intermediate dispersion liquid resulting from the reduction step with a solvent having a N-methyl pyrolidone content of 50 mass % or more (NMP-containing solvent);
a strong stirring step for stirring the intermediate dispersion liquid resulting from the NMP mixing step at a shear rate of 5,000 per second to 50,000 per second; and
a water removal step for removing at least part of the water from the intermediate dispersion liquid by a combination of the addition of a NMP-containing solvent and suction filtration or by distillation.

Once the dispersion liquid is dried, the graphene will undergo strong interlaminar agglomeration. To allow the graphene dispersion liquid to maintain a good dispersion state, therefore, it is particularly effective to prevent the graphene from being dried in the reduction step and all subsequent steps (all steps including a fine fragmentation step and/or a surface treatment step as described later that may be performed before the reduction step).

[Preparation Method for Graphene Oxide]

There are no specific limitations on the method to be used for the preparation of graphene oxide, and a generally known method such as the Hummers method may be adopted. A commercially available graphene oxide product may also be used. Described below is an example procedure that uses the Hummers method to prepare graphene oxide.

Add graphite (graphite powder) and sodium nitrate to concentrated sulfuric acid and then add potassium permanganate little by little while stirring to prevent the temperature from rising. Continue stirring to maintain the reaction at 25° C. to 50° C. for 0.2 to 5 hours. Subsequently, add ion-exchanged water for dilution to prepare a suspension liquid and maintain the reaction at 80° C. to 100° C. for 5 to 50 minutes. Finally, add hydrogen peroxide and deionized water and maintain the reaction for 1 to 30 minutes to provide a graphene oxide dispersion liquid. Filtrate and wash the resulting graphene oxide dispersion liquid to provide gel of graphene oxide. This graphene oxide gel may be diluted for use in mixing treatment with a surface treatment agent or reduction treatment.

The graphite material used for producing graphene oxide may be either artificial graphite or natural graphite, of which, however, natural graphite is preferred. The grain size of the graphite raw material is preferably 20,000 mesh or less, more preferably 5,000 mesh or less.

Typical quantities of the reactants per 10 g of graphite are as follows: concentrated sulfuric acid 150 to 300 ml, sodium nitrate 2 to 8 g, potassium permanganate 10 to 40 g, and hydrogen peroxide 40 to 80 g. When adding sodium nitrate and potassium permanganate, use an ice bath to control the temperature. When adding hydrogen peroxide and deionized water, the weight of deionized water should be 10 to 20 times that of hydrogen peroxide. The concentrated sulfuric acid to be used preferably has a concentration by mass of 70% or more, more preferably 97% or more.

Graphene oxide has high dispersibility, but the substance itself has insulating properties and cannot serve as conductive additive or the like. If the graphene oxide material has an excessively high degree of oxidation, the graphene powder obtained by its reduction will likely be low in electric conductivity, and therefore, the proportion of carbon atoms to oxygen atoms in the graphene oxide material, determined by X-ray photoelectron spectroscopy, is preferably 0.5 or more. The graphene oxide material should be dry and free of solvents when subjected to X-ray photoelectron spectroscopy.

If graphite should not be oxidized thoroughly, flaky graphene powder will not be obtained easily in the reduction step. Therefore, it is preferable for the graphene oxide material to give no detectable peaks attributable to graphite when examined by X-ray diffraction after drying.

The degree of oxidation of the graphene oxide material can be controlled by changing the quantity of the oxidizing agent used to oxidize graphite. More specifically, the degree of oxidation increases with increasing quantities of sodium nitrate and potassium permanganate relative to the quantity of graphite used in the oxidization reaction, whereas the degree of oxidation decreases with decreasing quantities thereof. There are no specific limitations on the weight ratio of sodium nitrate to graphite, but it is preferably 0.200 or more and 0.800 or less, more preferably 0.250 or more and 0.500 or less, and still more preferably 0.275 or more and 0.425 or less. There are no specific limitations on the weight ratio of potassium permanganate to graphite, but it is preferably 1.00 or more, more preferably 1.40 or more, and still more preferably 1.65 or more. On the other hand, it is preferably 4.00 or less, more preferably 3.00 or less, and still more preferably 2.55 or less.

[Reduction Step]

In the reduction step, graphene oxide dispersed in a water-containing dispersion medium is reduced to graphene.

The water-containing dispersion medium may be water alone or may contain a solvent other than water. Such a solvent other than water is preferably a polar solvent, and preferable examples include ethanol, methanol, 1-propanol, 2-propanol, N-methylpyrolidone, dimethylformamide, dimethylacetamide, dimethylsulfoxide, γ-butyrolactone, and mixtures thereof.

There are no specific limitations on the method to be used for the reduction of graphene oxide, but the use of chemical reduction is preferable. For chemical reduction, useful reduction agents include organic reduction agents and inorganic reduction agents, of which inorganic reduction agents are preferred from the viewpoint of easiness of washing after the reduction step.

Useful organic reduction agents include aldehyde based reduction agents, hydrazine derivative reduction agents, and alcohol based reduction agents, of which alcohol based reduction agents are particularly preferred because they can perform relatively slow reduction. Useful alcohol based reduction agents include methanol, ethanol, propanol, isopropyl alcohol, butanol, benzyl alcohol, phenol, ethanol amine, ethylene glycol, propylene glycol, and diethylene glycol.

Useful inorganic reduction agents include sodium dithionite, potassium dithionite, phosphorous acid, sodium borohydride, and hydrazine, of which sodium dithionite and potassium dithionite are preferred because they can hold acidic groups relatively strongly during the reduction step, thereby serving to produce a graphene with high dispersibility in solvents.

[Washing Step]

After the reduction step, it is preferable to adopt a washing step designed for dilution with water and filtration in order to provide a gel-like dispersion liquid consisting mainly of graphene dispersed in water. In the present Description, any intermediate material, gel-like or not, that is not a finally completed graphene dispersion liquid according to the present invention, but forms before the completion of the production process and contains graphene or graphene oxide dispersed in a dispersion medium is referred to as an intermediate dispersion liquid for convenience's sake.

[Surface Treatment Step]

A surface treatment step designed for mixing with a surface treatment agent having an acidic group may be added, as required, before, after, or in the middle of the reduction step. Useful surface treatment agents are as given previously.

For proper mixing of graphene oxide and a surface treatment agent, it is preferable to perform the mixing in a state where both the graphene oxide or graphene obtained after reduction and the surface treatment agent are dispersed in solvents (dispersion mediums). In this instance, it is preferable that both the graphene oxide and the surface treatment agent be completely dissolved, but part thereof may be left undissolved and dispersed in a solid state. The solvent to be used is preferably a polar solvent, and although there are no specific limitations, good examples include water, ethanol, methanol, 1-propanol, 2-propanol, N-methylpyrolidone, dimethylformamide, dimethylacetamide, dimethylsulfoxide, γ-butyrolactone, and mixtures thereof.

[Fine Fragmentation Step]

A fine fragmentation step designed for finely fragmenting the graphene may be added, in some instances, before, after, or in the middle of the reduction step. Useful solvents for use in the fine fragmentation step are as described previously for the surface treatment step. Graphene oxide is preferably in a finely fragmented state when used in the reduction step and therefore, the fine fragmentation step is preferably performed before the reduction step or in the middle of the reduction step.

The addition of the fine fragmentation step serves to allow the graphene oxide or graphene to have an appropriate size S in the planar direction. There are no specific limitations on the method to be used for the fine fragmentation, and available methods include one in which a plurality of pieces, such as beads and balls, of a crushing medium are mixed with a dispersion liquid and caused to strike against each other in order to crush and disperse the graphene oxide or graphene, but a medium-free technique in which a large shear force is applied to the dispersion liquid without using a crushing media is preferred because the agglomeration of pieces of graphene oxide or graphene can be induced in the former technique. For example, specific techniques include one in which a pressure is applied to an intermediate dispersion liquid to cause it to collide against a single ceramic ball and one that uses a liquid-liquid shearing type wet jet mill in which streams of an intermediate dispersion liquid are caused to collide against each other to achieve dispersion. The application of ultrasonic waves to an intermediate dispersion liquid is also a medium-free dispersion technique that is preferred. In the fine fragmentation step, graphene oxide and graphene tend to be fragmented more finely with an increasing treatment pressure and output used in the medium-free dispersion method, and they also tend to be fragmented more finely with an increasing treatment time. The preferred size S in the planar direction of graphene is as described previously. The size of graphene obtained after the reduction step can be controlled by selecting an appropriate type of fine fragmentation treatment, treatment condition, and treatment time for the fine fragmentation step.

[NMP Mixing Step]

To replace the water in the intermediate dispersion liquid resulting from the reduction step with an organic solvent, an NMP mixing step is carried out to mix the intermediate dispersion liquid with a solvent having an NMP content of 50 mass % or more (hereinafter occasionally referred to simply as NMP-containing solvent). In the NMP mixing step, the intermediate dispersion liquid resulting from the reduction step, or that further subject to a washing step, surface treatment step, and/or fine fragmentation step in some instances, is mixed directly with an NMP containing solvent. This means that once the reduction step is finished, the intermediate dispersion liquid is always in the state of a dispersion liquid until it is mixed with an NMP-containing solvent in the NMP mixing step, and any step, such as freeze-drying, designed to obtain powdery graphene by removing the dispersion medium from the intermediate dispersion liquid is not performed.

The NMP-containing solvent may contain, in addition to NMP itself, a polar solvent such as ethanol, methanol, 1-propanol, 2-propanol, N-methylpyrolidone, dimethylformamide, dimethylacetamide, dimethylsulfoxide, γ-butyrolactone, acetonitrile, and acetone, as long as NMP accounts for 50 mass % or more. If the NMP content in the solvent is less than 50 mass %, the dispersibility of graphene in the solvent tends to decrease.

There are no specific limitations on the mixing ratio between the intermediate dispersion liquid resulting from the reduction step and the NMP-containing solvent, but if the quantity of the NMP-containing solvent to be mixed is too small, the resulting liquid mixture will be high in viscosity and difficult to handle, whereas if the quantity of the NMP-containing solvent to be mixed is too large, the quantity of graphene per unit treatment quantity will decrease, leading to deterioration in treatment efficiency. With the aim of increasing the treatment efficiency while allowing the dispersion liquid to maintain a low viscosity to ensure easy handling, it is preferable to add 10 to 3,000 parts by mass, more preferably 20 to 2,000 parts by mass, and still more preferably 50 to 1,500 parts by mass, of the NMP-containing solvent to 100 parts by mass of the intermediate dispersion liquid resulting from the reduction step.

[Strong Stirring Step]

Subsequently, the intermediate dispersion liquid resulting from the NMP mixing step is fed to a next step (strong stirring step) designed to stir it at a shear rate of 5,000 per second to 50,000 per second. The strong stirring step serves to exfoliate the graphene to break down the layered agglomeration of the graphene. It should be noted that in the present Description, any rotary blade type mixer that can apply a required shear force to an intermediate dispersion liquid is referred to as a high shear mixer.

For the strong stirring step, the shear rate is 5,000 per second to 50,000 per second. The shear rate is calculated by dividing the circumferential speed at the end of the maximum diameter of the rotary blade of the mixer by the distance from the wall surface to the tip of the rotary blade of the mixer (the tip of the blade that defines the maximum diameter). The circumferential speed of the rotary blade of a mixer is calculated as circumference×rotating speed. If the shear rate is too small, the graphene will not undergo exfoliation easily, leading to a low degree of graphene exfoliation. If the shear rate is too large, on the other hand, the degree of graphene exfoliation will become too high, causing a decrease in dispersibility. The shear rate is preferably 10,000 or more per second and more preferably 20,000 or more per second. Similarly, it is preferably 45,000 or less per second and more preferably 40,000 or less per second. Furthermore, the treatment in the strong stirring step preferably lasts for 15 seconds to 300 seconds, more preferably for 20 seconds to 120 seconds, and still more preferably for 30 seconds to 80 seconds.

The high shear mixer used in the strong stirring step should be of a thin film rotation type, rotor/stator type, etc., in which the distance between the rotating blade and the wall surface is short, specifically 10 mm or less, and it is preferably a medium-free mixer. Examples of such a mixer include Filmics (registered trademark) Model 30-30 (manufactured by Primix), Clearmix (registered trademark) CLM-0.8S (manufactured by M Technique. Co. Ltd.), and Super Shear Mixer SDRT 0.35-0.75 (manufactured by Satake Chemical Equipment Mfg., Ltd.).

[Water Removal Step]

The water removal step is designed for removing at least part of the water content of the intermediate dispersion liquid by a combination of the addition of a NMP-containing solvent and suction filtration or by distillation. The use of such a solvent remove means as compression filtration or centrifugal separation that applies a large force to graphene contained in the dispersion liquid is not preferred because of the tendency to cause layered agglomeration of the graphene. Such a water removal step is preferably performed at a stage after the end of the strong stirring step, but if the NMP mixing step precedes, it may be performed before the strong stirring step.

To carry out the combination of the addition of a NMP-containing solvent and suction filtration during the water removal step, it is preferable to add a NMP-containing solvent to the intermediate dispersion liquid first, followed by stirring it and performing suction filtration under reduced pressure. Specifically, such suction filtration under reduced pressure can be carried out by filtering the liquid while performing suction by a diaphragm pump etc. using a Buchner funnel, Hirsch funnel, or the like. In this instance, this procedure may be repeated a plurality of times to minimize the residual ratio of the solvent used in the reduction step.

It is also a preferred means to remove water by distillation. There are no specific limitations on the pressure to be used for the distillation, but vacuum distillation is preferred because water can be removed efficiently.

[Heat Treatment Step]

Furthermore, the quantity of bound water in the intermediate dispersion liquid can be decreased if a step for heating the intermediate dispersion liquid (heat treatment step) is carried out at a stage after the reduction step. If applied to lithium ion battery manufacturing, therefore, it can serve to reduce the adverse influence on the battery performance that might result from gas generation caused by electrolysis of water released from graphene. Such heat treatment may be achieved by, for example, feeding the intermediate dispersion liquid into a heating and stirring apparatus and stirring it while heating in such a manner that it will not be dried. The heating temperature is preferably 70° C. or more and more preferably 80° C. or more. At high temperatures, part of the functional groups such as the hydroxyl group can be desorbed from graphene and accordingly, the heating temperature is preferably 150° C. or less, more preferably 120° C. or less. From the viewpoint of efficient removal of water, furthermore, it is particularly preferable for the heat treatment step and the strong stirring step to be performed simultaneously, which may be achieved by carrying out the stirring treatment by a high shear mixer while heating.

In the case where distillation is adopted for the water removal step, its simultaneous implementation with the heat treatment step can be achieved by performing distillation while heating at 70° C. or more, and this is preferable because free water, adsorbed water, and bound water can be removed simultaneously in one stage. In this case, the method of performing vacuum distillation while heating at 70° C. or more is particularly preferable. More specifically, a good means is the use of a heating and stirring apparatus equipped with a rotary evaporator or a vacuum line.

<Graphene-Electrode Active Material Composite Particles>

There are no specific limitations on the uses of the graphene dispersion liquid according to the present invention, but it works effectively when used, for example, in combining graphene and electrode active material particles, such as electrode active material particles for lithium ion batteries, to produce a composite. The expression "to produce a composite" used above means maintaining a state in which graphene is in contact with the surface of electrode active material particles. Preferred embodiments of such composite production include combining graphene and electrode active material particles together into integrated particles or adhering graphene on the surfaces of electrode active material particles.

When used for producing graphene-electrode active material composite particles, the active material to be adopted may be either a positive electrode active material or a negative electrode active material. This means that the graphene dispersion liquid according to the present invention can serve for both positive electrode production and negative electrode production. When used as electrode active material particles for lithium ion batteries, there are no specific limitations on positive electrode active materials, and useful ones include composite oxides of lithium and transition metals such as lithium cobaltate ($LiCoO_2$), lithium nickelate ($LiNiO_2$), spinel type lithium manganate ($LiMn_2O_4$), ternary compounds with cobalt partially substituted by nickel and manganese ($LiMn_xNi_yCo_{1-x-y}O_2$), and spinel type lithium manganate ($LiMn_2O_4$); olivine based (phosphoric acid based) active materials such as iron lithium phosphate ($LiFePO_4$); metal oxides such as $V_2O_5$; and metal compounds such as $TiS_2$, $MoS_2$, and $NbSe_2$. There are no specific limitations on negative electrode active materials, and useful ones include carbon based materials such as natural graphite, artificial graphite, and hard carbon; silicon compounds containing SiO, SiC, SiOC, etc., as basic constituents; lithium titanate ($Li_4Ti_5O_{12}$), and metal oxides such as manganese oxide (MnO) and cobalt oxide (CoO) that can undergo conversion reaction with lithium ions.

Graphene-electrode active material composite particles can be produced by mixing the graphene dispersion liquid according to the present invention and active material particles and drying the mixture by an appropriate technique such as spray drying and freeze-drying. Useful methods for mixing a graphene dispersion liquid and active material particles include the use of such a tool as three roll mill, wet bead mill, wet planetary ball mill, homogenizer, planetary mixer, and twin screw kneading machine.

<Production Method for Electrode Paste>

The graphene dispersion liquid according to the present invention also serves to produce electrode paste for lithium ion battery electrodes. Specifically, such electrode paste can be produced by mixing an electrode active material, binder, and the graphene dispersion liquid according to the present invention as conductive additive, as well as an appropriate quantity of solvent if required.

Electrode active materials suitable to produce electrode paste for lithium ion batteries include those active materials described above in relation to the production method for graphene-active material composite particles.

There are no specific limitations on the binder to be used, and useful examples include fluorine based polymers such as polyvinylidene fluoride (PVDF) and polytetrafluoroethylene (PTFE); rubbers such as styrene butadiene rubber (SBR) and natural rubber; polysaccharides such as carboxymethyl cellulose; and others such as polyimide precursor and/or polyimide resin, polyamide-imide resin, polyamide resin, polyacrylic acid, sodium polyacrylate, acrylic resin, and polyacrylonitrile. They may be used as mixtures of two or more thereof.

The conductive additive to be used may be the graphene alone contained in the graphene dispersion liquid according to the present invention, and another conductive additive may be used in addition. There are no specific limitations on the additional conductive additive, and useful examples include carbon black materials such as furnace black, Ketjen Black (registered trademark), and acetylene black, graphite materials such as natural graphite (scale-like graphite etc.) and artificial graphite, conductive fibers such as carbon fiber and metal fiber, and powdery metals such as copper, nickel, aluminum, and silver.

Useful examples of the solvent to be used additionally include NMP, γ-butyrolactone, water, and dimethyl acetamide, and it is the most preferable to adopt NMP, which is used as solvent in the graphene dispersion liquid according to the present invention.

EXAMPLES

Measurement Example 1: X-Ray Photoelectron Method

For each sample, the X-ray photoelectron measuring method was carried out using Quantera SXM (manufactured by PHI). The excited X-ray used was monochromatic Al $K\alpha1,2$ beam (1486.6 eV), and the X-ray beam diameter and photoelectron take-off angle were 200 μm and 45°, respectively. Assuming that the C1s main peak based on carbon atoms was at 284.3 eV, the peak near 533 eV was attributed to the O1s peak based on oxygen atoms and the peak near 402 eV was attributed to the N1s peak based on nitrogen atoms, followed by determining the O/C ratio and the N/C ratio from the area ratios of the peaks.

Measurement Example 2: Evaluation of Specific Surface Area

The specific surface area of graphene was measured by HM Model-1210 (manufactured by Macsorb). Measurements were made according to JIS Z8830 (2013). Specifically, the quantity of adsorbed gas was measured by the carrier gas method and the adsorption data were analyzed by the one point method. Deaeration was performed at 100° C. for 180 minutes. To prepare samples to be used for the measurement, an aqueous dispersion of reduced graphene obtained in Examples given below was filtered through a suction filtration apparatus and a washing step consisting of dilution with water to 0.5 mass % and suction filtration was repeated five times, followed by freeze-drying to provide a graphene powder.

Measurement Example 3: Solid Content (G)

A specimen of the graphene dispersion liquid was deposited on a glass substrate with a known weight and the total weight was measured, followed by heating for 1.5 hours on a hot plate with a temperature adjusted to 120° C. to volatilize the solvent. The solid content G (mass %) of the graphene dispersion liquid was determined from the weight of the volatilized solvent calculated from the difference between the weight of the graphene dispersion liquid specimen before heating and that after heating. This procedure was repeated three times and the average was adopted.

Measurement Example 4: Absorbance

The absorbance of each sample was measured using a U-3010 spectrophotometer (manufactured by Hitachi High-Tech Science Corporation). A quartz cell with an optical path length of 10 mm was used. For the measurement, NMP was added to the graphene dispersion liquid or graphene powder prepared in each Example described below to adjust the graphene weight fraction to 0.000013. Baseline measurement based on a mixed solvent with the same proportion as in the diluent solution was performed in advance for a diluent solution treated for 10 minutes in an ultrasonic cleaning machine (ASU-6M, manufactured by As One Corporation) with an output of 130 W and an oscillating frequency of 40 kHz (output setting "High"). The weight-based absorptivity coefficient, which is defined as Equation (1) given below, was calculated from the absorbance measured at 270 nm.

Weight-based absorptivity coefficient (cm$^{-1}$)=absorbance/{(0.000013×cell's optical path length (cm))} (1)

Then, the absorbance ratio, which is defined as Equation (2) given below, was calculated:

absorbance ratio=absorbance (270 nm)/absorbance (600 nm). (2)

Measurement Example 5: Median Diameter (D) of Graphene

A specimen of a graphene dispersion liquid or graphene powder diluted with NMP to 0.5 mass % was examined by the laser diffraction/scattering particle size distribution measuring method using a particle size distribution measuring apparatus manufactured by Horiba (Laser Scattering Particle Size Distribution Analyzer LA-920) to determine its particle size distribution, and the particle diameter corresponding to the median was adopted as median diameter (D, μm). The same solvent as contained in the graphene dispersion liquid was used in the apparatus and measurement was performed without applying ultrasonic waves as pre-treatment. The refractive index of graphene was set to be 1.43.

Measurement Example 6: Thickness of (T) of Graphene

A specimen of the graphene dispersion liquid or graphene powder was diluted with NMP to 0.002 mass %, dropped on a mica substrate, and dried to allow it to adhere to the substrate. The graphene specimen on the substrate was observed by an atomic force microscope (Dimension Icon, manufactured by Bruker) and the thickness of the graphene specimen was measured at randomly selected 50 points, followed by calculating the average T (nm). For a specimen having a significant thickness variation, the average over the surface area was determined.

Measurement Example 7: Size in the Planar Direction of Graphene (S)

A specimen of the graphene dispersion liquid or graphene powder was diluted with an NMP solvent to 0.002 mass %, dropped on a glass substrate, and dried to allow it to adhere to the substrate. A graphene specimen on a substrate was observed by a VK-X250 laser microscope manufactured by Keyence Corporation. Fifty fragments were randomly selected and the longest size (largest diameter, μm) and the shortest size (smallest diameter, μm) across each graphene fragment was measured. The value of (largest diameter+smallest diameter)/2 was calculated for the 50 fragments and the average was adopted as the size in the planar direction of graphene (S, μm).

Measurement Example 8: Measurement of Water Content

A specimen of the graphene dispersion liquid or graphene powder was examined by AQ-2200 Karl Fischer Aquameter and a EV-2010 water vaporizing apparatus (manufactured by Hiranuma Sangyo Co., Ltd.) and its water content was determined by the water vaporization-coulometric titration method specified in JIS K 0113 (2005) 8.3. A specimen of the graphene dispersion liquid or graphene powder was fed to the water vaporizing apparatus and heated at 130° C. or 250° C., where measurements were taken to provide the water content values of W1 (mass %) and W2 (mass %).

Measurement Example 9: Evaluation of Battery Performance

The discharge capacity was measured as described below in all Examples and Comparative examples unless otherwise specified. A specimen of the graphene dispersion liquid or graphene powder prepared in each Example or Comparative example having a graphene solid content corresponding to 1.5 parts by mass was combined with 100 parts by mass of $LiNi_{0.5}Co_{0.2}Mn_{0.3}O_2$ used as electrode active material, 1.5 parts by mass of acetylene black as additional conductive additive, 5 parts by mass of polyvinylidene fluoride as binder, and 100 parts by mass of NMP as solvent, and they were mixed in a planetary mixer to prepare an electrode paste. This electrode paste was spread over a piece of aluminum foil (with a thickness of 18 μm) using a doctor blade (300 μm) and dried at 80° C. for 15 minutes, followed by vacuum drying to prepare an electrode plate.

A disk with a diameter of 15.9 mm was cut out from the electrode plate prepared above to use as positive electrode while a disk with a diameter of 16.1 mm to use as negative electrode was produced from a counter electrode mixture of 98 parts by mass of graphite, 1 part by mass of carboxymethyl cellulose sodium, and 1 part by mass of an aqueous SBR dispersion. A disk with a diameter 17 mm cut out from Celgard #2400 (manufactured by Celgard) was used as separator while a solvent of ethylene carbonate and diethyl carbonate mixed at a ratio of 7:3 containing 1M $LiPF_6$ was used as electrolyte to prepare a 2042 type coin battery. A charging and discharging measurement run was repeated three times under the conditions of an upper limit voltage of 4.2 V, a lower limit voltage 3.0 V, and a rate of 0.1 C, 1 C, and 5 C in this order, and subsequently it was repeated 491 times at 1 C, thus carrying out a total of 500 charging and discharging runs. The discharge capacity was determined for the third of the runs performed at 1 C, the third of the runs performed at 5 C, and the 491st of the subsequent runs performed at 1 C (i.e., the 500th of all runs).

Synthesis Example 1: Preparation Method for Graphene Oxide Gel

Natural graphite powder of 1,500 mesh (manufactured by Shanghai Yifan Graphite Co., Ltd.) was used as starting material, and 220 ml of 98% concentrated sulfuric acid, 5 g of sodium nitrate, and 30 g of potassium permanganate were added to 10 g of natural graphite powder in an ice bath, followed by mechanical stirring for 1 hour while maintaining the liquid mixture at a temperature of 20° C. or less. This liquid mixture was taken out of the ice bath and stirred in a 35° C. water bath for 4 hours to ensure thorough reaction, followed by pouring 500 ml of ion-exchanged water and continuing reaction of the resulting suspension liquid at 90° C. for additional 15 minutes. Finally, 600 ml of ion-exchanged water and 50 ml of hydrogen peroxide were added and reaction was continued for 5 minutes to provide a graphene oxide dispersion liquid. After filtering it while it is hot, the metal ion was washed with a dilute hydrochloric acid solution and the acid was washed with ion-exchanged water. Washing was performed repeatedly until reaching a pH of 7 to provide a graphene oxide gel. For the resulting graphene oxide gel, the element ratio of the oxygen atom to the carbon atom, which was determined by X-ray photoelectron spectroscopy, was 0.53.

Example 1

The graphene oxide gel prepared in Synthesis example 1 was diluted with ion-exchanged water to a concentration of 30 mg/ml and treated in an ultrasonic washing machine for 30 minutes to provide a uniform graphene oxide dispersion liquid.

A 20 ml portion of the resulting graphene oxide dispersion liquid was mixed with 0.3 g of dopamine hydrochloride used as surface treatment agent and treated in Homodisper Model 2.5 (manufactured by Primix) at a rotating speed of 3,000 rpm for 60 minutes (surface treatment step). After the treatment, the graphene oxide dispersion liquid was diluted with ion-exchanged water to 5 mg/ml, and 0.3 g of sodium dithionite was added to 20 ml of the diluted dispersion liquid, followed by maintaining reduction reaction at 40° C. for 1 hour (reduction step). Subsequently, it was filtered through a reduced-pressure suction filtration machine, further diluted with ion-exchanged water to 0.5 mass %, and subjected to suction filtration. This washing step was repeated 5 times to ensure thorough washing. After the washing, it was diluted with NMP to 0.5 mass % (NMP-containing solvent mixing step) and treated by Filmics (registered trademark) Model 30-30 (manufactured by Primix) at a rotating speed of 40 m/s (shear rate: 20,000 per second) for 60 seconds (strong stirring step), followed by suction filtration. After the filtration, it was diluted with NMP to 0.5 mass % and treated in Homodisper Model 2.5 (manufactured by Primix) at a rotating speed of 3,000 rpm for 30 minutes, followed by suction filtration. This step (water removal step) was repeated twice to provide a graphene NMP dispersion liquid.

For the resulting graphene NMP dispersion liquid, the solid content G was measured as described in Measurement example 3, and the absorbance, weight-based absorptivity coefficient, and absorbance ratio were measured as described in Measurement example 4. Then, the median diameter D of the graphene, the thickness T of the graphene, and the size S in the planar direction of the graphene, D/S, and S/T were determined as described in Measurement examples 5, 6, and 7, and W1, W2, and (W2−W1)/G were calculated as described in Measurement example 8. For analysis, the graphene NMP dispersion liquid was diluted 3 times with water and subjected to suction filtration, followed by repeating additional dilution and suction filtration twice to prepare a 0.5 mass % aqueous graphene dispersion, which was freeze-dried to provide a graphene powder. For the resulting graphene powder, the specific surface area, (W2−W1)/(G×specific surface area), O/C ratio, and N/C ratio were determined as described in Measurement examples 1 and 2. Furthermore, the resulting graphene NMP dispersion liquid was subjected to battery performance evaluation as described in Measurement example 9 to determine the discharge capacity. Results obtained are summarized in Tables 1 and 2.

Example 2

Except for operating Filmics at a rotating speed of 30 m/s (shear rate: 15,000 per second) in the strong stirring step, the same procedure as in Example 1 was carried out to produce a graphene NMP dispersion liquid.

For the resulting graphene NMP dispersion liquid, the solid content G was measured as described in Measurement example 3, and the absorbance, weight-based absorptivity coefficient, and absorbance ratio were measured as described in Measurement example 4. In addition, the thickness T of graphene and the size S in the planar direction of graphene were measured as described in Measurement examples 6 and 7. For analysis, the graphene NMP dispersion liquid was diluted 3 times with water and subjected to suction filtration, followed by repeating additional dilution and suction filtration twice to prepare a 0.5 mass % aqueous graphene dispersion, which was freeze-dried to provide a graphene powder. For the resulting graphene powder, the specific surface area, O/C ratio, and N/C ratio were determined as described in Measurement examples 1 and 2. Furthermore, the resulting graphene NMP dispersion liquid was subjected to battery performance evaluation as described in Measurement example 9 to determine the discharge capacity. Results obtained are summarized in Table 1.

Example 3

Except for operating Filmics at a rotating speed of 20 m/s (shear rate: 10,000 per second) in the strong stirring step, the same procedure as in Example 1 was carried out to produce a graphene NMP dispersion liquid.

Physical properties evaluation and battery performance evaluation were carried out in the same manner as described in Example 2. Results obtained are summarized in Table 1.

Example 4

Except for using 0.3 g of antipyrine as surface treatment agent, the same procedure as in Example 1 was carried out to produce a graphene NMP dispersion liquid.

Physical properties evaluation and battery performance evaluation were carried out in the same manner as described in Example 2. Results obtained are summarized in Table 1.

Example 5

Except for using 0.3 g of catechol as surface treatment agent, the same procedure as in Example 1 was carried out to produce a graphene NMP dispersion liquid.

Physical properties evaluation and battery performance evaluation were carried out in the same manner as described in Example 2. Results obtained are summarized in Table 1.

Example 6

Except for not adding a surface treatment agent, the same procedure as in Example 1 was carried out to produce a graphene NMP dispersion liquid.

Physical properties evaluation and battery performance evaluation were carried out in the same manner as described in Example 2. Results obtained are summarized in Table 1.

Example 7

After adding a surface treatment agent and performing treatment in Homodisper Model 2.5 (manufactured by Primix), the graphene oxide dispersion liquid was subjected to ultrasonic treatment for 40 minutes using an ultrasonic apparatus (UP400S, manufactured by Hielscher) with an output of 300 W (fine fragmentation step) before diluting the graphene oxide dispersion liquid with ion-exchanged water to 5 mg/ml. Except for this, the same procedure as in Example 1 was carried out to produce a graphene NMP dispersion liquid.

Physical properties evaluation and battery performance evaluation were carried out in the same manner as described in Example 1. Results obtained are summarized in Table 2.

Example 8

Except for subjecting the graphene NMP dispersion liquid to heated reflux treatment (heat treatment) at 90° C. for 2 hours before the last suction filtration step as performed in Example 7 where Example 1 is cited, the same procedure as in Example 7 was carried out to produce a graphene NMP dispersion liquid.

Physical properties evaluation and battery performance evaluation were carried out in the same manner as described in Example 1. Results obtained are summarized in Table 2.

Example 9

All treatment steps up to the Filmics treatment step were performed in the same manner as described in Example 7. Subsequently, as a means of distillation for water removal, the graphene NMP dispersion liquid was heated at 120° C. as air was evacuated by a diaphragm pump to remove water (water removal step). In addition, heated reflux treatment (heat treatment) was carried out at 90° C. for 2 hours and then suction filtration was performed to provide a graphene NMP dispersion liquid.

Physical properties evaluation and battery performance evaluation were carried out in the same manner as described in Example 1. Results obtained are summarized in Table 2.

Example 10

A graphene NMP dispersion liquid produced by the same procedure as in Example 1 and $LiNi_{0.5}Co_{0.2}Mn_{0.3}O_2$ used as electrode active material were mixed at a solid content ratio of 3:100, diluted with NMP to a solid content of 10 mass %, and then treated by Filmics (registered trademark) Model 30-30 (manufactured by Primix) at a rotating speed of 40 m/s (shear rate: 20,000 per second) for 60 seconds. The treated material was dried by a spray dryer with an inlet temperature of 250° C. and an outlet temperature of 160° C. to provide particles of a composite of graphene and the $LiNi_{0.5}Co_{0.2}Mn_{0.3}O_2$ electrode active material (graphene-electrode active material composite particles).

Except for using the above-mentioned composite particles (100 parts by mass) as electrode active material for the positive electrode and not adding a graphene dispersion liquid as a simple form, the same procedure as in Measurement example 9 was carried out for battery performance evaluation.

Physical properties evaluation was carried out in the same manner as described in Example 2. Results obtained are summarized in Table 1.

Comparative Example 1

In the procedure described in Example 1, the washing step consisting of dilution with water and suction filtration was followed by dilution with water to 0.7 mass % and freeze-drying to provide a graphene powder.

The resulting graphene powder was examined as described in Measurement example 4 to determine the absorbance, weight-based absorptivity coefficient, and absorbance ratio. In addition, the thickness T of graphene and the size S in the planar direction of graphene were measured as described in Measurement examples 6 and 7, and the specific surface area, O/C ratio, and N/C ratio were determined as described in Measurement examples 1 and 2. Furthermore, the resulting graphene powder was subjected to battery performance evaluation as described in Measurement example 9 to determine the discharge capacity. Results obtained are summarized in Table 1.

Comparative Example 2

Except for replacing the strong stirring step with another step that adopts Homodisper Model 2.5 (manufactured by Primix), which is lower in shear force than Filmics, instead of Filmics and performs treatment at a rotating speed of 3,000 rpm for 30 minutes, the same procedure as in Example 1 was carried out to produce a graphene NMP dispersion liquid. In this instance, Homodisper had a rotary blade with a diameter of 30 mm and accordingly a calculated circumferential speed of 4.7 m/s. The container used for stirring had an inside diameter of 50 mm and the distance between the wall surface and the rotary blade was 10 mm. The shear rate is calculated at 470 per second. Physical properties evaluation and battery performance evaluation were carried out in the same manner as described in Example 2. Results obtained are summarized in Table 1.

Comparative Example 3

Except for carrying out centrifugal sedimentation instead of suction filtration in the water removal step, the same procedure as in Example 1 was carried out to produce a graphene NMP dispersion liquid.

Physical properties evaluation and battery performance evaluation were carried out in the same manner as described in Example 2. Results obtained are summarized in Table 1.

Comparative Example 4

The graphene powder obtained in Comparative example 1 was diluted to 0.5 mass % by adding NMP, and treated by Filmics (registered trademark) Model 30-30 (manufactured by Primix) at a rotating speed of 40 m/s (shear rate: 20,000 per second) for 60 seconds to provide a graphene NMP dispersion liquid.

Physical properties evaluation and battery performance evaluation were carried out in the same manner as described in Example 2. Results obtained are summarized in Table 1.

In some Examples given above, namely, Examples 1, 7, 8, and 9, the median diameter D, D/S, S/T, W1, W2, (W2−W1)/G, and (W2−W1)/(G×specific surface area) were determined for the graphene obtained, and their results are shown separately in Table 2.

TABLE 1

| | Graphene dispersion liquid production conditions | | | Physical properties of graphene dispersion liquid | | | | | | | | | | Battery performance evaluation | | |
|---|---|---|---|---|---|---|---|---|---|---|---|---|---|---|---|---|
| | surface treatment agent | stirring | water removal | solid content [mass %] | O/C ratio | N/C ratio | size in planar direction [μm] S | thickness T [nm] | specific surface area [m²/g] | absorbance [270 nm] | weight-based absorptivity coefficient [cm⁻¹] | absorbance ratio 270 nm/ 600 nm | form in electrode | discharge capacity 1C [mAh/g] | discharge capacity 5C [mAh/g] | discharge capacity 1C (500 cycles) [mAh/g] |
| Example 1 | dopamine hydrochloride | Filmics shear rate: 20,000/s shearing time 60 s | suction filtration under reduced pressure | 4.1 | 0.15 | 0.013 | 3.2 | 16 | 136 | 1.009 | 77,600 | 1.96 | simple, not composite | 140 | 85 | 119 |
| Example 2 | dopamine hydrochloride | Filmics shear rate: 15,000/s shearing time 60 s | suction filtration under reduced pressure | 4.1 | 0.14 | 0.013 | 3.5 | 17 | 121 | 0.884 | 68,000 | 1.87 | | 139 | 81 | 111 |
| Example 3 | dopamine hydrochloride | Filmics shear rate: 10,000/s shearing time 60 s | suction filtration under reduced pressure | 4.2 | 0.14 | 0.012 | 3.9 | 17 | 108 | 0.712 | 54,800 | 1.74 | | 138 | 77 | 106 |
| Example 4 | antipyrine | Filmics shear rate: 20,000/s shearing time 60 s | suction filtration under reduced pressure | 4.2 | 0.14 | 0.015 | 3.3 | 18 | 101 | 0.568 | 43,700 | 1.94 | | 130 | 71 | 95 |
| Example 5 | catechol | Filmics shear rate: 20,000/s shearing time 60 s | suction filtration under reduced pressure | 4.1 | 0.16 | 0 | 3.1 | 17 | 82 | 0.537 | 41,300 | 1.96 | | 129 | 68 | 90 |
| Example 6 | none | Filmics shear rate: 20,000/s shearing time 60 s | suction filtration under reduced pressure | 4.3 | 0.09 | 0 | 3.4 | 15 | 496 | 0.438 | 33,700 | 1.96 | | 114 | 63 | 76 |
| Example 10 | dopamine hydrochloride | Filmics shear rate: 20,000/s shearing time 60 s | suction filtration under reduced pressure | — | 0.15 | 0.013 | 3.2 | 16 | 136 | 1.009 | 77,600 | 1.96 | composite with active material particles | 141 | 87 | 128 |
| Comparative example 1 | dopamine hydrochloride | Filmics shear rate: 20,000/s shearing time 60 s | — | — | 0.15 | 0.013 | 3.3 | 16 | 136 | 0.289 | 22,200 | 1.58 | simple | 101 | 45 | 31 |
| Comparative example 2 | dopamine hydrochloride | Homodisper stirring shear rate: | suction filtration under | 4.0 | 0.15 | 0.010 | 4.2 | 16 | 61 | 0.321 | 24,700 | 1.63 | | 102 | 46 | 32 |

TABLE 1-continued

| | Graphene dispersion liquid production conditions | | | Physical properties of graphene dispersion liquid | | | | | | | | | Battery performance evaluation | | |
|---|---|---|---|---|---|---|---|---|---|---|---|---|---|---|---|
| | surface treatment agent | stirring | water removal | solid content [mass %] | O/C ratio | N/C ratio | size in planar direction [µm] S | thickness [nm] T | specific surface area [m²/g] | absorbance [270 nm] | weight-based absorptivity coefficient [cm⁻¹] | absorbance ratio 270 nm/ 600 nm | form in electrode | discharge capacity 1C [mAh/g] | discharge capacity 5C [mAh/g] | discharge capacity 1C (500 cycles) [mAh/g] |
| Comparative example 3 | dopamine hydrochloride | 470/s shearing time 30 min Filmics shear rate: 20,000/s shearing time 60 s | reduced pressure centrifugal sedimentation | 4.0 | 0.15 | 0.010 | 3.3 | 25 | 55 | 0.311 | 23,900 | 1.62 | | 102 | 46 | 32 |
| Comparative example 4 | dopamine hydrochloride | Filmics shear rate: 20,000/s shearing time 60 s | — | 0.5 | 0.15 | 0.010 | 3.3 | 16 | 136 | 0.295 | 22,700 | 1.59 | | 102 | 45 | 32 |

TABLE 2

| | Graphene dispersion liquid production conditions | | | Physical properties of graphene dispersion liquid graphene powder | | | | | |
|---|---|---|---|---|---|---|---|---|---|
| | fragmentation | heat treatment | water removal | solid content [mass %] | median diameter [μm] D | size in planar direction [um] S | D/S | thickness [nm] T | S/T |
| Example 1 | none | none | suction filtration under reduced pressure | 4.1 | 5.4 | 3.2 | 1.7 | 16 | 0.200 |
| Example 7 | 300W 40 min | none | suction filtration under reduced pressure | 5.2 | 5.2 | 2.8 | 1.4 | 12 | 0.233 |
| Example 8 | 300W 30 min | 90° C. 2 h treatment | suction filtration under reduced pressure | 0.041 | 5.2 | 2.8 | 1.4 | 12 | 0.233 |
| Example 9 | 300W 30 min | 90° C. 3 h treatment | distillation | 0.04 | 5.2 | 2.8 | 1.4 | 12 | 0.233 |

| | Physical properties of graphene dispersion liquid graphene powder | | | | | | Battery performance evaluation | | |
|---|---|---|---|---|---|---|---|---|---|
| | specific surface area [m²/g] | (W2-W1)/ G | (W2-W1)/ (G × specific surface area) [g/m²] | absorbance [270 nm] | weight-based absorptivity coefficient [cm⁻¹] | absorbance ratio 270 nm/ 600 nm | discharge capacity 1C [mAh/g] | discharge capacity 5C [mAh/g] | discharge capacity 1C (500 cycles) [mAh/g] |
| Example 1 | 136 | 0.032 | 0.000235 | 1.009 | 77,600 | 1.96 | 140 | 85 | 119 |
| Example 7 | 156 | 0.032 | 0.000205 | 1.063 | 81,800 | 2.06 | 141 | 87 | 124 |
| Example 8 | 154 | 0.024 | 0.000156 | 1.112 | 85,500 | 2.14 | 142 | 92 | 128 |
| Example 9 | 143 | 0.016 | 0.000112 | 1.156 | 88,900 | 2.17 | 146 | 94 | 131 |

The invention claimed is:

1. A graphene dispersion liquid comprising graphene dispersed in a solvent having a N-methyl pyrolidone content of 50 mass % or more and, when diluted with N-methylpyrolidone to a graphene weight fraction of 0.000013, giving a diluted solution having a weight-based absorptivity coefficient, which is calculated by Equation (1) given below, of 25,000 cm⁻¹ or more and 200,000 cm⁻¹ or less at a wavelength of 270 nm:

weight-based absorptivity coefficient (cm⁻¹)=absorbance/{0.000013×cell's optical path length (cm)}  (1).

2. A graphene dispersion liquid as claimed in claim 1, wherein the diluted solution has an absorbance ratio, which is calculated by Equation (2) given below, of 1.70 or more and 4.00 or less:

absorbance ratio=absorbance (270 nm)/absorbance (600 nm)  (2).

3. A graphene dispersion liquid as claimed in claim 1, wherein the graphene has an element ratio of oxygen to carbon (O/C ratio), which is determined by X-ray photoelectron spectroscopy, of 0.05 or more and 0.40 or less.

4. A graphene dispersion liquid as claimed in claim 1 further comprising a surface treatment agent having an acidic group.

5. A graphene dispersion liquid as claimed in claim 1, wherein the graphene has an element ratio of nitrogen to carbon (N/C ratio), which is determined by X-ray photoelectron spectroscopy, of 0.005 or more and 0.030 or less.

6. A graphene dispersion liquid as claimed in claim 1, wherein the graphene has a specific surface area, which is determined by the BET measuring method, of 80 m²/g or more and 250 m²/g or less.

7. A graphene dispersion liquid as claimed in claim 1, wherein the solid content is 0.3 mass % or more and 40 mass % or less.

8. A graphene dispersion liquid as claimed in claim 1, wherein the median diameter D (μm) of the graphene measured by the laser diffraction/scattering type particle size distribution measurement method and the average size S (μm) in the planar direction of the graphene calculated from the arithmetic mean of the longest diameter and shortest diameter of the graphene observed by a laser microscope meet both Equations (3) and (4) given below:

$$0.5 \text{ μm} \leq S \leq 15 \text{ μm} \tag{3}$$

$$1.0 \leq D/S \leq 3.0 \tag{4}.$$

9. A production method for graphene-electrode active material composite particles comprising a step for mixing a graphene dispersion liquid as claimed in claim 1 and electrode active material particles and a subsequent step for drying.

10. A production method for electrode paste comprising a step for mixing an electrode active material, a binder, and a graphene dispersion liquid as claimed in claim 1.

11. A production method for a graphene dispersion liquid comprising: a reduction step for reducing graphene oxide dispersed in a water-containing dispersion medium;
   an NMP mixing step for mixing the intermediate dispersion liquid resulting from the reduction step with a solvent having a N-methylpyrolidone content of 50 mass % or more (NMP-containing solvent);
   a strong stirring step for stirring the intermediate dispersion liquid resulting from the NMP mixing step at a shear rate of 5,000 per second to 50,000 per second; and
   a water removal step for removing at least part of the water from the intermediate dispersion liquid by a combination of the addition of a NMP-containing solvent and suction filtration or by distillation.

12. A production method for the graphene dispersion liquid as claimed in claim 11 further comprising a fine fragmentation step for finely fragmenting the graphene or graphene oxide contained in the intermediate dispersion liquid before or after the reduction step or in the middle of the reduction step.

13. A production method for the graphene dispersion liquid as claimed in claim 11 further comprising a heat treatment step for heating the intermediate dispersion liquid at a stage after the reduction step.

14. A production method for the graphene dispersion liquid as claimed in claim 11 further comprising a surface treatment step for mixing the intermediate dispersion liquid with a surface treatment agent having an acidic group before or after the reduction step or in the middle of the reduction step.

* * * * *

UNITED STATES PATENT AND TRADEMARK OFFICE
CERTIFICATE OF CORRECTION

PATENT NO. : 10,636,586 B2
APPLICATION NO. : 15/760506
DATED : April 28, 2020
INVENTOR(S) : Koichiro Manabe et al.

Page 1 of 1

It is certified that error appears in the above-identified patent and that said Letters Patent is hereby corrected as shown below:

On the Title Page

Item [72], Inventors:
"Koichiro Manabe, Otsu (JP)" should read --Koichiro Manabe, Otsu-shi, Shiga (JP)--.
"Eiichiro Tamaki, Otsu (JP)" should read --Eiichiro Tamaki, Otsu-shi, Shiga (JP)--.
"Manabu Kawasaki, Otsu (JP)" should read --Manabu Kawasaki, Otsu-shi, Shiga (JP)--.

Item [57], ABSTRACT, Lines 10 and 11:
"25,000 cm-1 or more and 200,000 cm-1" should read --25,000 $cm^{-1}$ or more and 200,000 $cm^{-1}$--.

Signed and Sealed this
Twenty-first Day of July, 2020

Andrei Iancu
*Director of the United States Patent and Trademark Office*